US012294171B2

(12) United States Patent
Reedy

(10) Patent No.: US 12,294,171 B2
(45) Date of Patent: May 6, 2025

(54) HIGH VOLTAGE ELECTRICAL TERMINAL WITH COMPLIANT CONTACT INSERT

(71) Applicant: Aptiv Technologies AG, Schaffhausen (CH)

(72) Inventor: Patrick J. Reedy, Youngstown, OH (US)

(73) Assignee: Aptiv Technologies AG, Schaffhausen (CH)

( * ) Notice: Subject to any disclaimer, the term of this patent is extended or adjusted under 35 U.S.C. 154(b) by 352 days.

(21) Appl. No.: 17/752,518

(22) Filed: May 24, 2022

(65) Prior Publication Data

US 2023/0387619 A1 Nov. 30, 2023

(51) Int. Cl.
*H01R 13/11* (2006.01)
*H01R 13/03* (2006.01)

(52) U.S. Cl.
CPC .............. *H01R 13/11* (2013.01); *H01R 13/03* (2013.01)

(58) Field of Classification Search
CPC ...... H01R 43/16; H01R 13/14; H01R 13/187; H01R 43/20; H01R 13/11; H01R 13/03
See application file for complete search history.

(56) References Cited

U.S. PATENT DOCUMENTS

| | | | | |
|---|---|---|---|---|
| 3,588,862 | A | 6/1971 | Brizzi | |
| 5,588,884 | A | 12/1996 | Rudoy et al. | |
| 6,276,960 | B1 | 8/2001 | Schaefer et al. | |
| 6,692,316 | B2 | 2/2004 | Hsieh et al. | |
| 9,300,069 | B2 | 3/2016 | Morello et al. | |
| 9,716,332 | B1 | 7/2017 | Wimmer et al. | |
| 10,230,191 | B2 | 3/2019 | Lui et al. | |
| 10,389,055 | B1 | 8/2019 | Lui et al. | |
| 2013/0157526 | A1 | 6/2013 | Martin | |
| 2014/0170912 | A1 | 6/2014 | Ando et al. | |
| 2014/0322976 | A1 | 10/2014 | Raschilla et al. | |
| 2019/0190179 | A1* | 6/2019 | Probert | H01R 13/6271 |
| 2022/0045452 | A1 | 2/2022 | Morello et al. | |

FOREIGN PATENT DOCUMENTS

| | | | | |
|---|---|---|---|---|
| CH | 702863 A1 | | 9/2011 | |
| CN | 106410464 B | * | 2/2019 | H01R 13/02 |
| EP | 3467949 A1 | | 4/2019 | |
| JP | 2004139875 A | * | 5/2004 | |
| JP | 3771836 B2 | * | 4/2006 | H01R 39/58 |

OTHER PUBLICATIONS

Extended European Search Report for Application No. 23171998.0; European Patent Office; mailed on Oct. 9, 2023, 11 Pages.

* cited by examiner

*Primary Examiner* — Jean F Duverne
(74) *Attorney, Agent, or Firm* — Billion & Armitage

(57) ABSTRACT

An electrical connector includes a generally planar terminal and a U-shaped retainer. The electrical connector also includes a resilient spring disposed intermediate the terminal and the retainer. A contact insert distinct from the resilient spring is disposed intermediate the spring and the terminal. The contact insert defines an array of paired negative and positive protrusions. The spring is configured to exert a normal connection force on the array of paired negative and positive protrusions and form electrical contact points between the terminal and a planar mating terminal inserted into a gap between the spring and the contact insert through the array of paired negative and positive protrusions. An electrical connector assembly and a method of manufacturing such an electrical connector assembly are also provided.

18 Claims, 7 Drawing Sheets

| # CONTACTS | FO/RCE CONTACT | TOTAL FORCE | RESISTANCE/ CONTACT | RESISTANCE ONE SIDE | RESISTANCE BOTH SIDES |
|---|---|---|---|---|---|
| 2 | 25 | 50 | 0.0461 | 0.0231 | 0.0461 |
| 4 | 12.5 | 50 | 0.0652 | 0.0163 | 0.0326 |
| 6 | 8.3333333 | 50 | 0.0799 | 0.0133 | 0.0266 |
| 8 | 6.285 | 50 | 0.0922 | 0.0115 | 0.0231 |
| 10 | 5 | 50 | 0.1031 | 0.0103 | 0.0206 |
| 12 | 4.1666667 | 50 | 0.1123 | 0.0094 | 0.0188 |
| 14 | 3.5714286 | 50 | 0.1220 | 0.0087 | 0.0174 |
| 16 | 3.125 | 50 | 0.1304 | 0.0082 | 0.0163 |
| 18 | 2.7777778 | 50 | 0.1383 | 0.0077 | 0.0154 |
| 20 | 2.5 | 50 | 0.1458 | 0.0073 | 0.0146 |
| 22 | 2.2727273 | 50 | 0.1529 | 0.0070 | 0.0139 |
| 24 | 2.0833333 | 50 | 0.1597 | 0.0067 | 0.0133 |
| 26 | 1.9230769 | 50 | 0.1662 | 0.0064 | 0.0128 |
| 28 | 1.7857143 | 50 | 0.1725 | 0.0062 | 0.0123 |
| 30 | 1.6666667 | 50 | 0.1786 | 0.0060 | 0.0119 |
| 32 | 1.5625 | 50 | 0.1844 | 0.0058 | 0.0115 |
| 34 | 1.4705882 | 50 | 0.1901 | 0.0056 | 0.0112 |

FIG. 11

HIGH VOLTAGE ELECTRICAL TERMINAL WITH COMPLIANT CONTACT INSERT

TECHNICAL FIELD

This disclosure is generally directed to high voltage electrical terminals and more particularly to a high voltage electrical terminals having a complaint contact insert.

BACKGROUND

It is known to use electrical terminals capable of carrying electrical current in excess of 100 amperes at voltages greater than 60 volts in electric vehicles (EVs) and hybrid-electric vehicles (HEVs). In addition, as internal combustion engine (ICE) vehicles become more electrified to reduce emission of greenhouse gasses, electrical terminals require increasingly robust and reliable designs.

FIG. 1 illustrates a prior high voltage electrical terminal 10 that includes a generally planar terminal 12 and a U-shaped retainer 14. The electrical connector 10 further includes a resilient spring 16 that is located between retainer 14 and the terminal 12. A planar mating terminal (not shown) is received within a gap between the spring 16 and the terminal 12 and the spring 16 provides a contact force between these terminals. The terminal 12 includes a pair of contact bumps 18 that make electrical contact with the mating terminal. Typically, two or three contact points are made between the contact bumps 18 and the mating terminal due to surface imperfections on the mating faces of the terminals. Because the physical size of each of these contact points is very small, the total contact resistance between the terminal 10 and the mating terminal is typically in the range of 20 to 30 micro-ohms at a 50 newton contact force. In order to reduce this contact resistance, the terminals may be plated with a low resistance material, such as silver or gold, to lower contact resistance. However, this extra his plating undesirably increases time and costs required to manufacture the high voltage electrical terminal. The electrical connector 10 may be used to terminate copper electrical bus bars. As the length of the bus bar increases, the difficulty and cost of selectively plating the ends of the bus bar forming the terminal also increases. Aluminum bus bars may be used in place of copper bus bars, however, the plating of the ends of the aluminum bus bars is even more challenging and costly than copper bus bars.

Lamella contact inserts, such as those shown in U.S. Pat. No. 10,230,191, have also been used in prior high voltage terminal designs to provide multiple contact points for low electrical resistance while also functioning as a contact spring to provide the contact force. The lamella contact inserts are formed from a copper-based material in order to provide a low resistance connection. However, the spring force of the lamella contact inserts has an inherent tendency to relax when the copper-based material is subjected to elevated temperatures, such as those experienced when conducting high currents through the terminal.

SUMMARY

According to one or more aspects of the present disclosure, an electrical connector includes a generally planar terminal and a U-shaped retainer. The U-shaped retainer has a first side wall attached to the terminal, a second side wall separated from and substantially parallel to the first side wall, and an end wall interconnecting the first side wall and the second side wall. The terminal is located intermediate the first side wall and the second side wall of the U-shaped retainer. The electrical connector further includes a resilient spring that is disposed intermediate. i.e., between, the second side wall and the terminal. The resilient spring is attached to the second side wall. The electrical connector also includes a contact insert that is separate and distinct from distinct from the resilient spring. The contact insert is disposed intermediate the spring and the terminal. The contact insert defines an array of paired negative and positive protrusions. The spring is configured to exert a normal connection force on the array of paired negative and positive protrusions and form electrical contact points between the terminal and a planar mating terminal inserted into a gap between the spring and the contact insert through the array of paired negative and positive protrusions.

In one or more embodiments of the electrical connector according to the previous paragraph, the terminal and the contact insert are formed of copper-based materials and the retainer and the spring are formed of steel materials.

In one or more embodiments of the electrical connector according to any one of the previous paragraphs, the negative protrusions are welded to the terminal.

In one or more embodiments of the electrical connector according to any one of the previous paragraphs, the contact insert defines a plurality of strips that form the array of paired negative and positive protrusions and wherein the contact insert defines a plurality of slots between the plurality of strips.

In one or more embodiments of the electrical connector according to any one of the previous paragraphs, the plurality of strips have an undulating shape that forms the array of paired negative and positive protrusions.

In one or more embodiments of the electrical connector according to any one of the previous paragraphs, embossments on edges of the plurality of strips that form the array of paired negative and positive protrusions.

In one or more embodiments of the electrical connector according to any one of the previous paragraphs, the embossments form each protrusion in the array of paired negative and positive protrusions in the shape of a spherical quadrant.

In one or more embodiments of the electrical connector according to any one of the previous paragraphs, the spring provides a majority of the normal connection force between the positive protrusions and the mating terminal.

According to one or more aspects of the present disclosure, an electrical connector assembly includes a generally planar terminal and a U-shaped retainer. The U-shaped retainer has a first side wall attached to terminal, a second side wall separated from and substantially parallel to the first side wall, and an end wall interconnecting the first side wall and the second side wall. The terminal is arranged intermediate the first side wall and the second side wall of the U-shaped retainer. The electrical connector assembly also includes a resilient spring that is disposed intermediate the second side wall and the terminal. The spring is attached to the second side wall of the U-shaped retainer. The electrical connector assembly additionally includes a contact insert that is separate and distinct from the resilient spring. The contact insert is disposed intermediate the spring and the terminal. The contact insert defining an array of paired negative and positive protrusions. The lectical connector assembly further includes a planar mating terminal that is inserted into a gap between the spring and the contact insert. The spring is configured to exert a normal connection force on the array of paired negative and positive protrusions and electrical contact points between the terminal and the mating terminal through the array of paired negative and positive protrusions.

In one or more embodiments of the electrical connector assembly according to the previous paragraph, the terminal, the mating terminal, and the contact insert are formed of copper-based materials and the retainer and the spring are formed of steel materials.

In one or more embodiments of the electrical connector assembly according to any one of the previous paragraphs, the negative protrusions are welded to the terminal.

In one or more embodiments of the electrical connector assembly according to any one of the previous paragraphs, the contact insert defines a plurality of strips that form the array of paired negative and positive protrusions. The contact insert defines a plurality of slots between the plurality of strips.

In one or more embodiments of the electrical connector assembly according to any one of the previous paragraphs, the plurality of strips have an undulating shape that forms the array of paired negative and positive protrusions.

In one or more embodiments of the electrical connector assembly according to any one of the previous paragraphs, embossments on edges of the plurality of strips that form the array of paired negative and positive protrusions.

In one or more embodiments of the electrical connector assembly according to any one of the previous paragraphs, the spring provides a majority of the normal connection force between the positive protrusions and the mating terminal.

In one or more embodiments of the electrical connector assembly according to any one of the previous paragraphs, the electrical connector assembly further includes a planar contact plate that is welded to the mating terminal and is arranged intermediate the positive protrusions and the mating terminal.

According to one or more aspects of the present disclosure, method of manufacturing an electrical connector assembly includes the steps of:

- providing a generally planar terminal;
- attaching a U-shaped retainer to the terminal;
- arranging a resilient spring intermediate the terminal and the retainer;
- forming a contact insert from a flat sheet of material to define an array of paired negative and positive protrusions;
- arranging the contact insert between the spring and the terminal;
- inserting a planar mating terminal into a gap between the spring and the contact insert;
- exerting a normal connection force provided by the spring on the array of paired negative and positive protrusions; and
- forming electrical contact points between the terminal and the mating terminal through the array of paired negative and positive protrusions.

In one or more embodiments of the method according to the previous paragraph, the method further includes creating a plurality of slots in the contact insert thereby forming a plurality of strips that provide the array of paired negative and positive protrusions.

In one or more embodiments of the method according to any one of the previous paragraphs, the method further includes forming the strips to have an undulating shape that provides the array of paired negative and positive protrusions.

In one or more embodiments of the method according to any one of the previous paragraphs, the method further includes embossing edges of the plurality of strips such that the array of paired negative and positive protrusions are in the shape of a spherical quadrant.

BRIEF DESCRIPTION OF THE DRAWINGS

The present invention will now be described, by way of example with reference to the accompanying drawings, in which:

FIG. 11 is a chart of the contact resistance and contact force of each pair of positive and negative protrusions in the contact insert of FIG. 4 or 6 and a terminal of the high voltage electrical terminal of FIG. 3 or 5.

DETAILED DESCRIPTION

Figure 2:
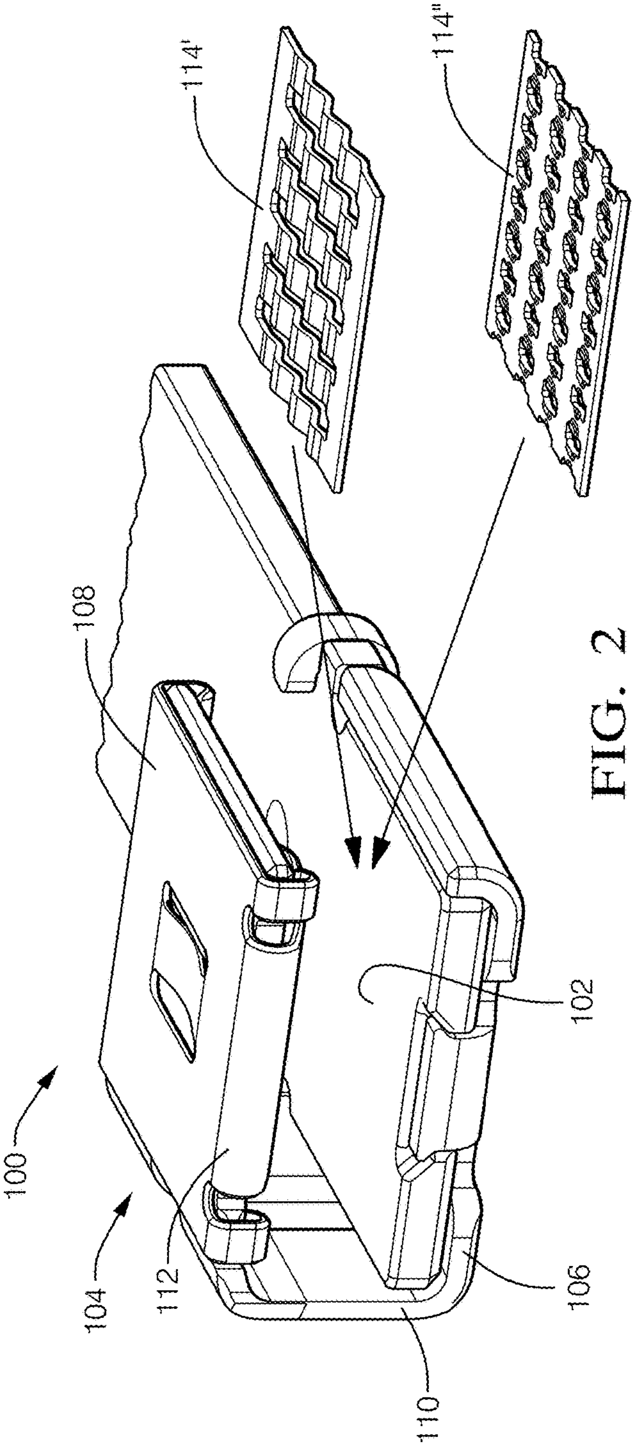
FIG. 2 is a perspective view of a high voltage electrical terminal according to several embodiments.
Figure 3:
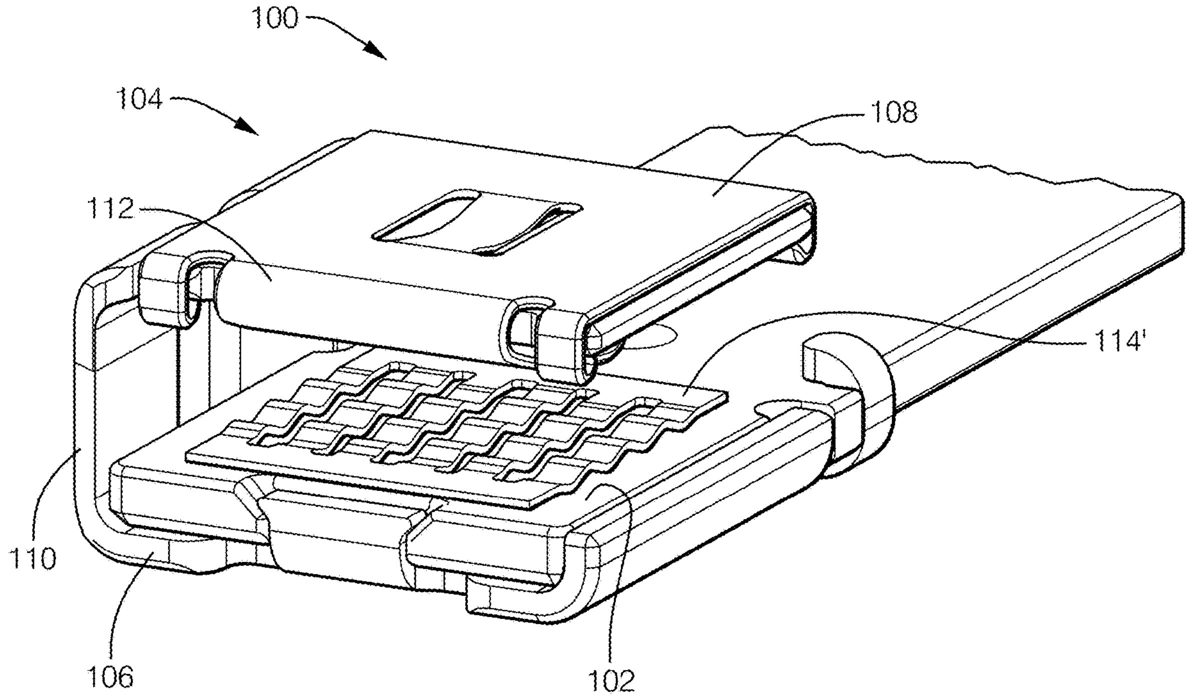
FIG. 3 is a perspective view of a high voltage electrical terminal according to some embodiments.

The electrical connector 100 illustrated in FIG. 2 includes a generally planar terminal 102, such as the end of a copper busbar conductor. In alternative embodiments, the terminal may be formed of aluminum, such as the end of an aluminum bus bar. A U-shaped retainer 104 has a first side wall 106 that is attached to the terminal 102. The retainer 104 also has a second side wall 108 that is separated from and is arranged substantially parallel to the first side wall 106. The retainer 104 further includes an end wall 110 interconnecting the first side wall 106 and the second side wall 108. The terminal 102 is arranged so that is located between the first side wall 106 and the second side wall 108. The retainer 104 is preferably formed of a high strength material, such as steel. A resilient spring 112 is attached to the second side wall 108 of the retainer 104 and is arranged between the second side wall 108 and the terminal 102. The spring 112 is preferably formed from a material that is less susceptible to relaxation due to temperature, such as a stainless steel material. The electrical connector 100 also includes a planar contact insert 114 that is separate and distinct from the spring 112 and the terminal 102. The contact insert 114 is disposed intermediate the spring 112 and the terminal 102.

The contact insert 114 defines an array of paired negative and positive protrusions 116, 118. The positive protrusions 116 extend from the contact insert 114 toward a gap between the spring 112 and the contact insert 114 and the negative protrusions 118 extend from the contact insert 114 toward the terminal 102. The contact insert 114 is formed from a material having a low electrical resistance, such as a copper-based material having a resistance of less than 100 micro-ohms/meter. The contact insert 114 may be formed from a sheet of this a copper-based material having a thickness of 0.3 to 0.5 millimeters. The spring is configured to exert a normal connection force on the array of paired negative and positive protrusions 116, 118 and form electrical contact points between the terminal 102 and a planar mating terminal (not shown) that is inserted into the gap between the spring 112 and the contact insert 114 through the array of paired negative and positive protrusions 116, 118. Since the spring 112 provides the majority of the contact force, the copper material forming the contact insert 114 can be a softer material. The negative and positive protrusions 116, 118 are configured to yield and conform to the terminal 102 and mating terminal once the mating terminal is inserted within the electrical connector 100, thereby creating an array of contact points between the terminal 102 and the mating terminal with balanced contact forces. The negative and positive protrusions 116, 118 may be designed to yield at a predetermined maximum contact force. Higher protrusions in the array of paired negative and positive protrusions 116, 118 are plasticly deformed while lower protrusions are elastically deformed, thereby providing the balanced contact force.

Welding the negative protrusions 118 to the terminal 102 using a laser welding or resistance welding process beneficially reduces the contact resistance and secures the contact insert 114 within the electrical connector 100. The contact insert 114 has a plurality of strips 120 that form the array of paired negative and positive protrusions 116, 118 and a plurality of slots 122 between the strips 120.

The spring 112 provides a majority of the normal connection force between the positive protrusions 116 and the mating terminal. As shown in FIG. 2, the contact insert 114 is one of at least two different designs contact insert 114', shown in detail in FIG. 4, and contact insert 114", shown in detail in FIG. 6.

Figure 4:
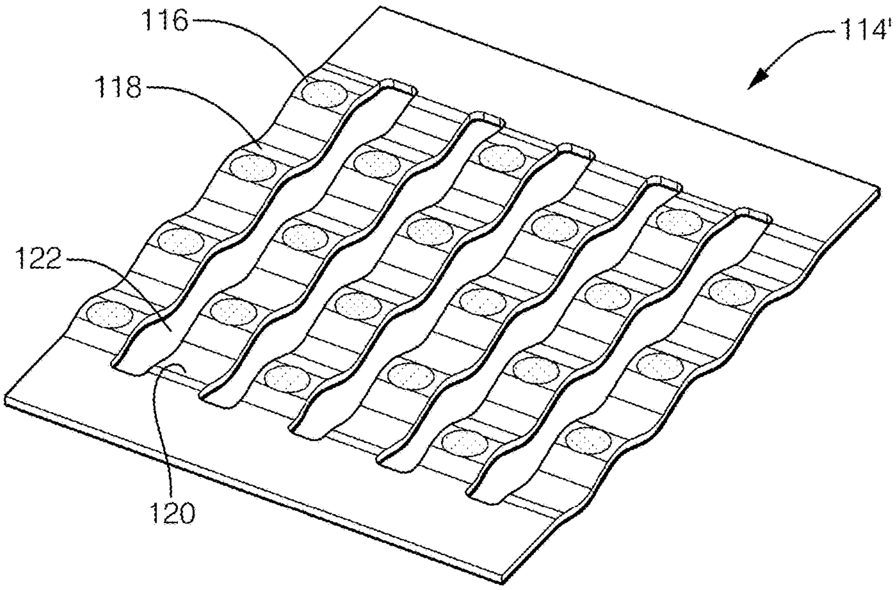
FIG. 4 is an isolated perspective view of a contact insert of the high voltage electrical terminal of FIG. 3 that has an array of paired positive and negative protrusions according to some embodiments.
Figure 5:
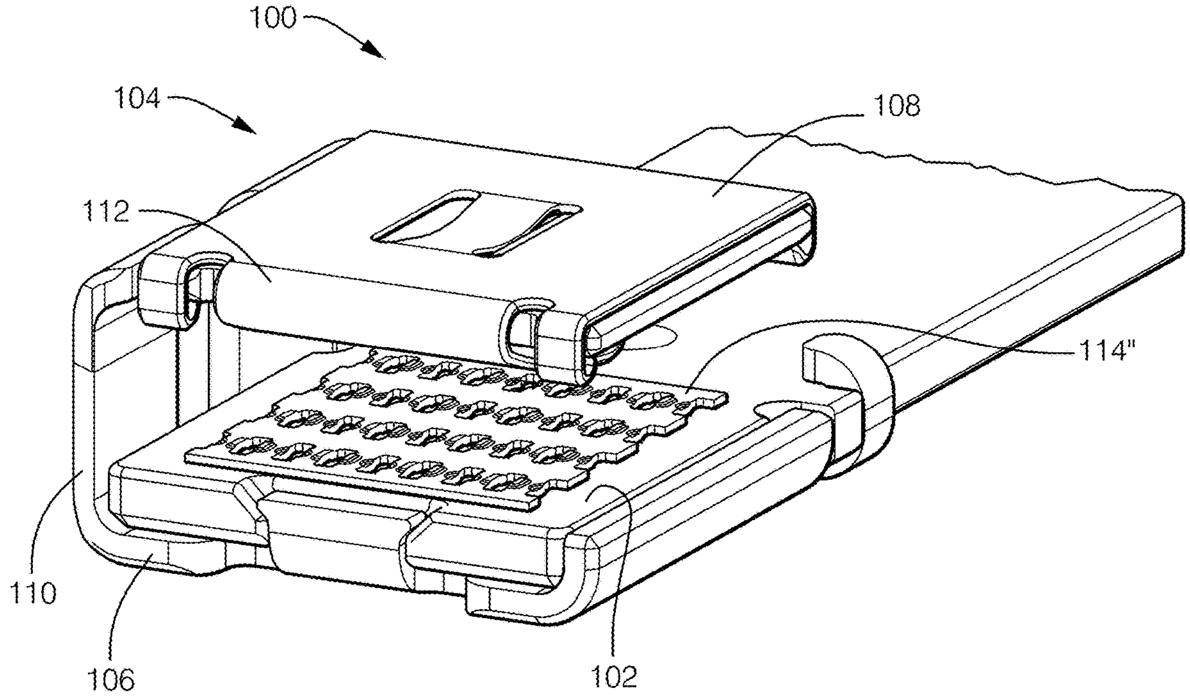
FIG. 5 is a perspective view of another high voltage electrical terminal according to some embodiments.

In the example of the contact insert 114' shown in FIG. 4, the plurality of strips 120 each have a wavy or undulating shape that forms the array of paired negative and positive protrusions 116, 118.

Figure 6:
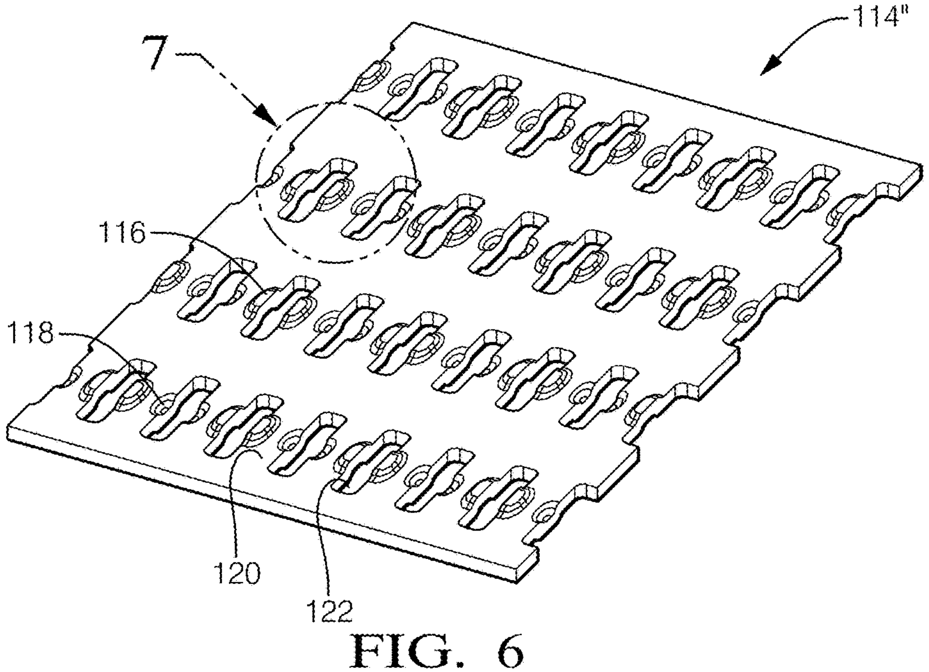
FIG. 6 is an isolated perspective view of a contact insert of the high voltage electrical terminal of FIG. 5 that has an array of paired positive and negative protrusions according to some embodiments.
Figure 7:
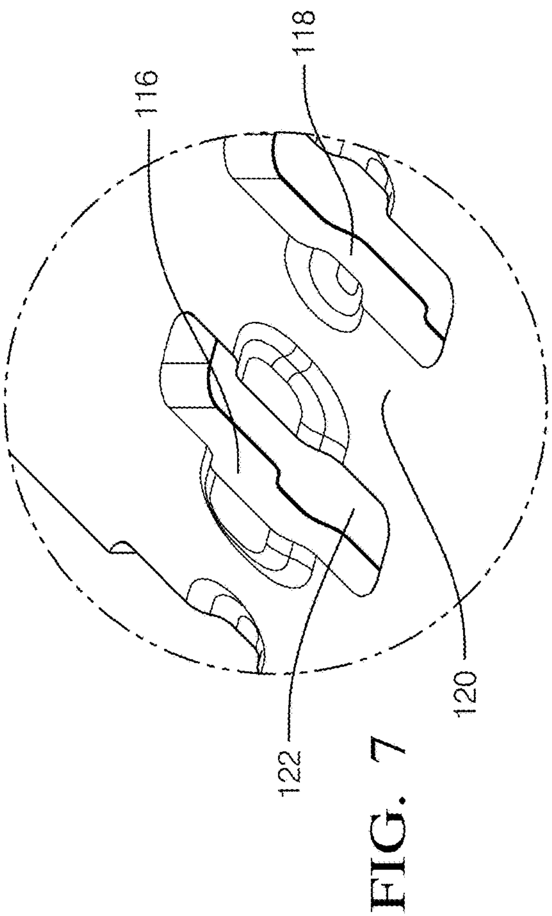
FIG. 7 is a close up view of a pair of positive and negative protrusions in the contact insert of FIG. 6 according to some embodiments.
Figure 8A:
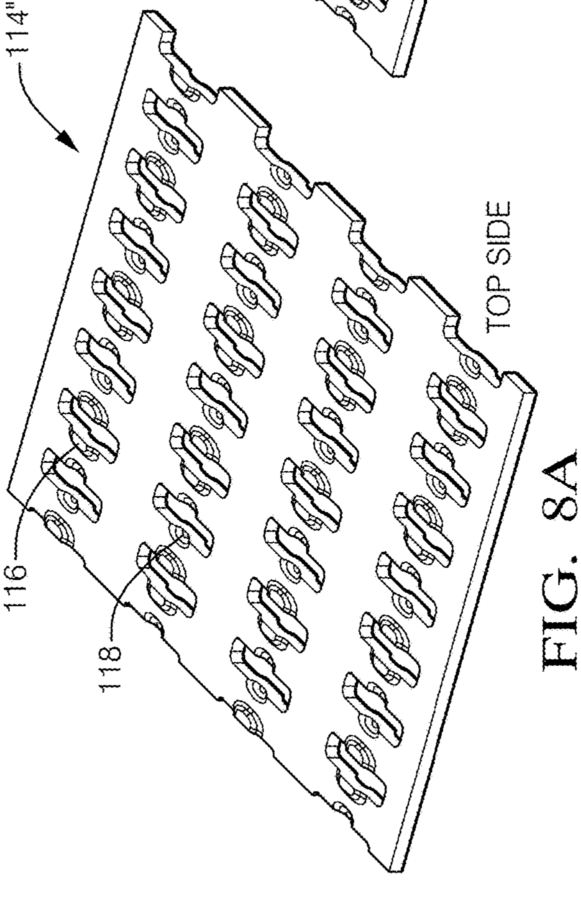
FIG. 8A is a perspective view of an array of positive protrusions on one side of the contact insert of FIG. 6 according to some embodiments.
Figure 8B:
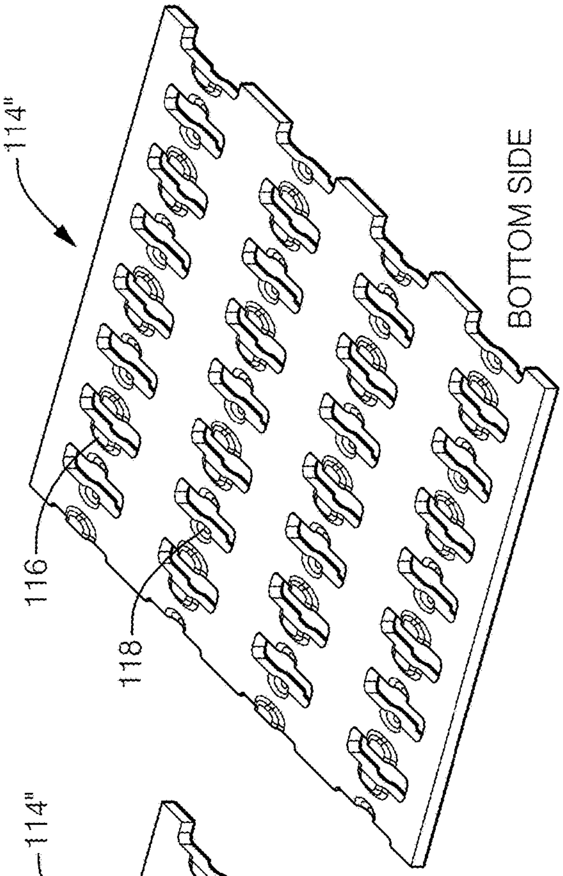
FIG. 8B is a perspective view of an array of negative protrusions on another side of the contact insert of FIG. 6 according to some embodiments.
Figure 9A:
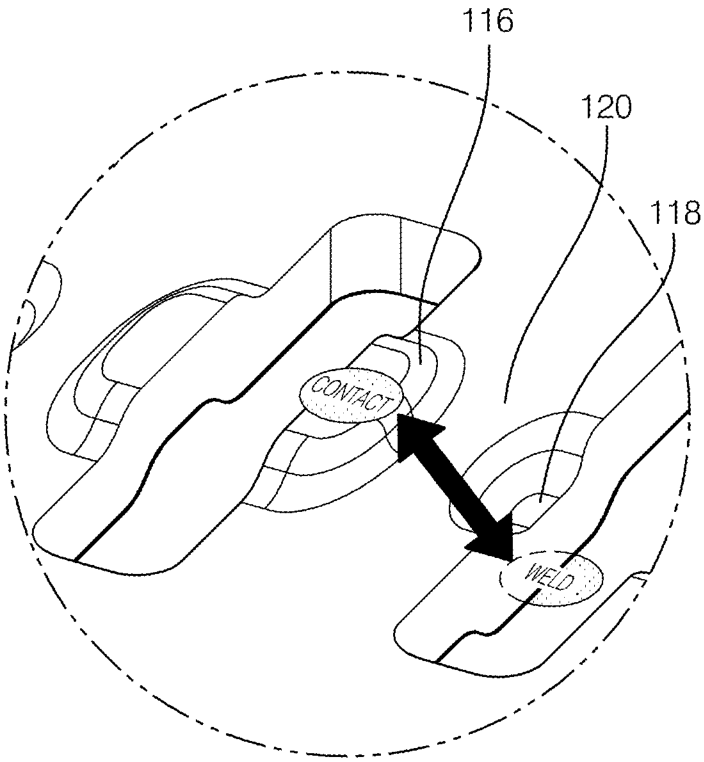
FIGS. 9A and 9B show the short current path and wide cross section between the positive and negative protrusions of FIGS. 8A and 8B according to some embodiments.
Figure 9B:
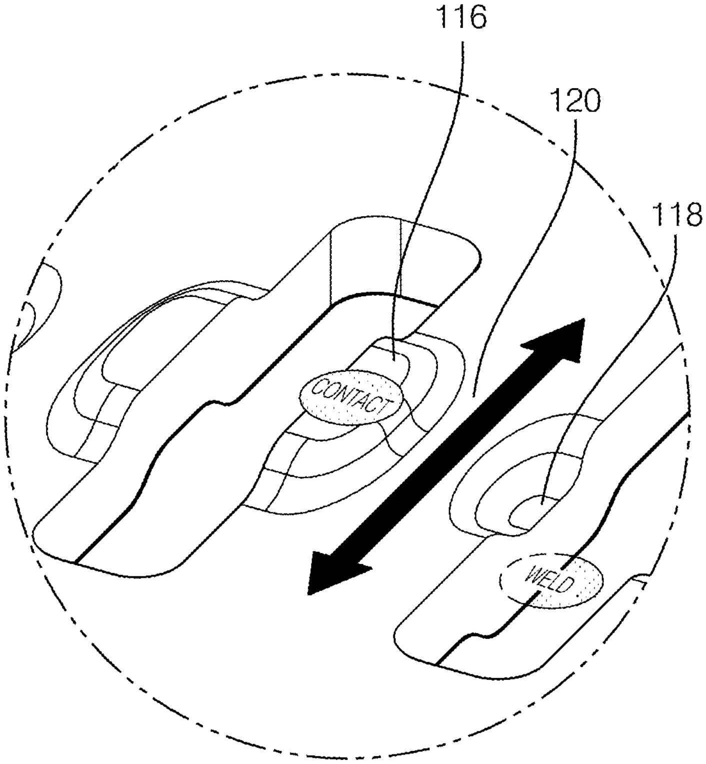

In the example of the contact insert 114" shown in FIG. 6, edges of the strips 120 are embossed to form the array of paired negative and positive protrusions 116, 118. These embossments form each protrusion in the shape of a spherical quadrant. The negative protrusions of either of the contact inserts 114', 114" may be welded to the terminal to further reduce the contact resistance between the terminal 102 and the mating terminal.

The contact insert 114 is preferably made from a thin stock, high conductivity plated copper. The contact insert 114 conforms to surface and alignment irregularities of the terminal 102 and mating terminal, thereby creating an array of contact points with balanced contact forces. The contact points are designed to yield, settling in at a predetermined maximum contact force, higher protrusions on the contact insert 114 yield while lower protrusions remain elastic. These balance out to maintain a consistent contact force. The array of paired negative and positive protrusions 116, 118 form a number of parallel circuit paths through contact points $R_{point\ 1}$ to $R_{point\ n}$:between the terminal 102 and the contact insert 114. Therefore, the total resistance $R_{total}$ between the terminal 102 and the contact insert 114 is equal to the inverse of the sum of the inverse of the point resistance of each of the contact points $R_{point\ 1}$ to $R_{point\ n}$ as shown in the parallel resistance equation below:

$$R_{total} = \frac{1}{\left(\frac{1}{R_{point1}} + \frac{1}{R_{point2}} \ldots + \frac{1}{R_{pointn}}\right)} \quad \text{Equation 1}$$

Figure 1:
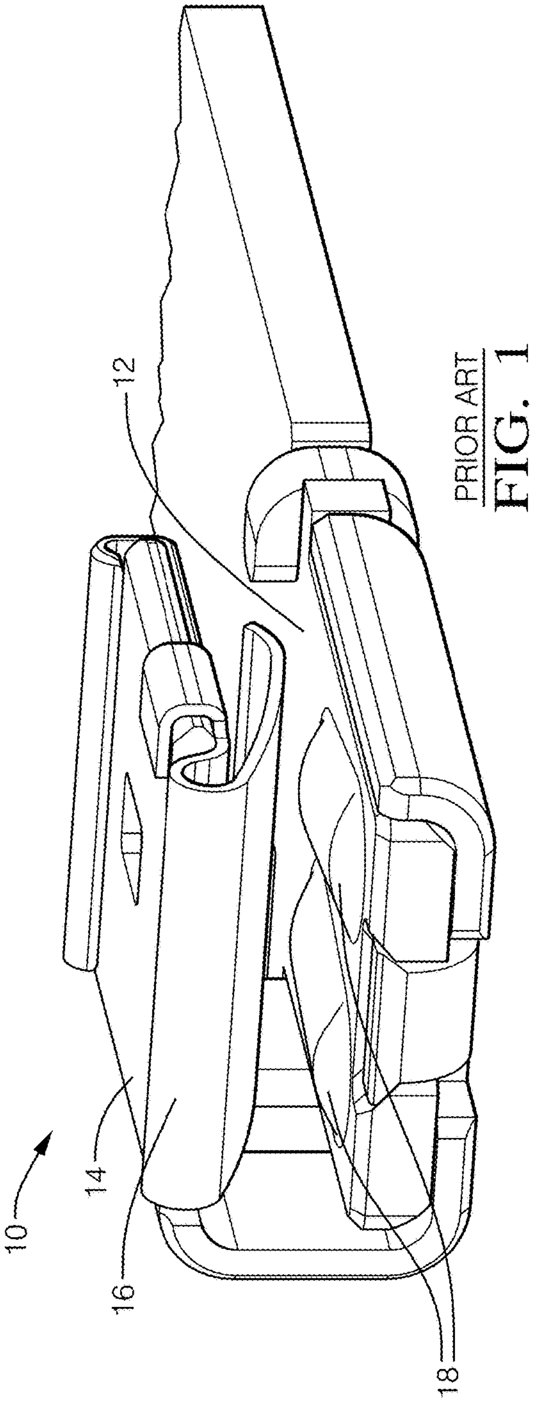
PRIOR ART FIG. 1
FIG. 1 is a perspective view of a high voltage electrical terminal according to the prior art.
Figure 10:
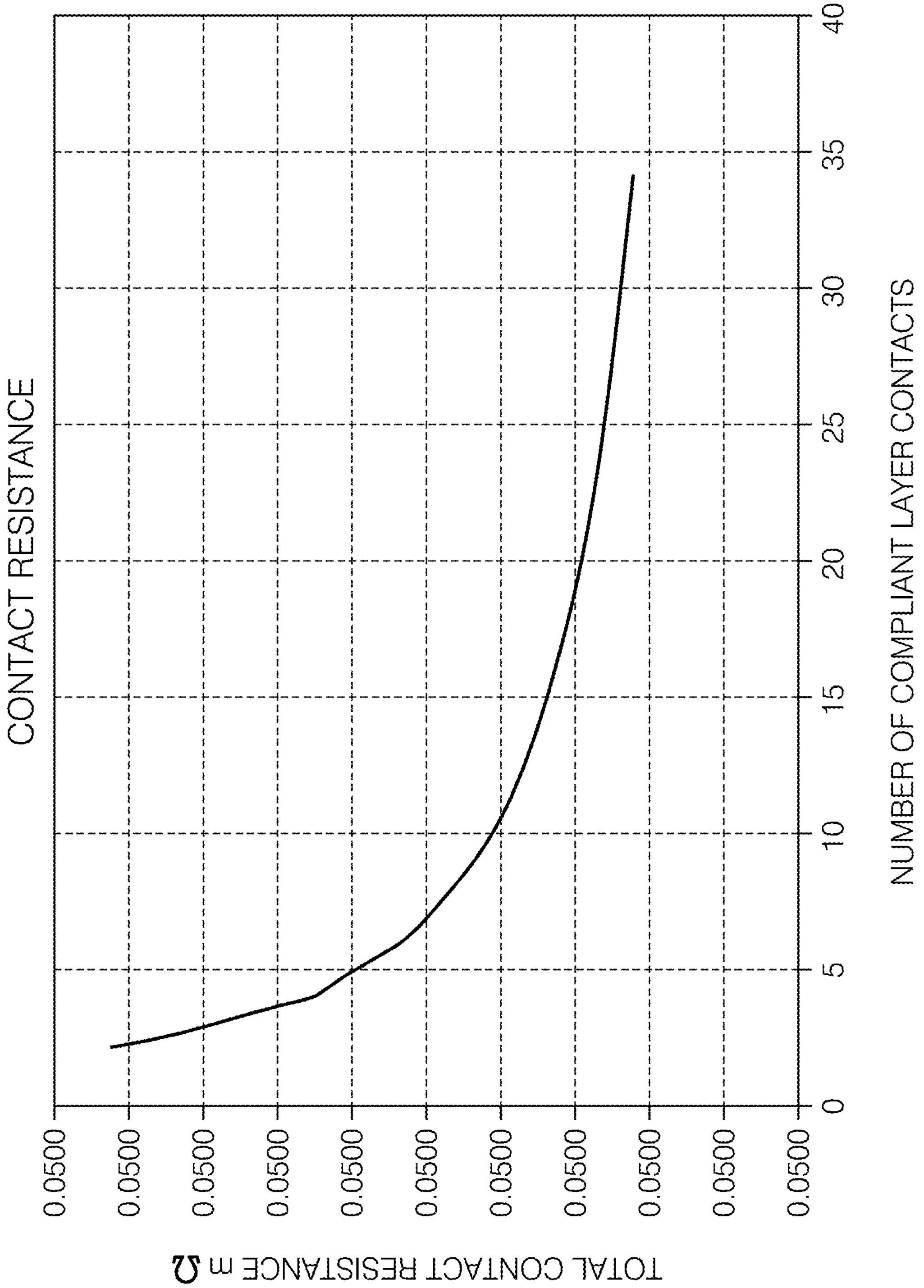
FIG. 10 is a graph of the total contact resistance of the contact insert vs. the number of contacts between the contact insert of FIG. 4 or 6 and a terminal of the high voltage electrical terminal of FIG. 3 or 5.

Therefore, the total resistance $R_{total}$ between the terminal 102 and the contact insert 114 decreases as the number n of contact points between the terminal 102 and the contact insert 114 increases as shown in the graph of FIG. 10 and the table of FIG. 11. As can be seen, there is an inflection point when the number n of contact points exceeds 10 to 15. The total resistance of 20 contact points is 25% to 50% lower than two contact points as provided by the prior art terminal illustrated in FIG. 1. The contact insert 114 eliminates the need to plate the terminal 102 with silver or gold as was needed with the prior art terminal 10 illustrated in FIG. 1.

The contact insert 114 reduces the contact resistance so that the terminal 102 no longer requires gold or silver plating. This is beneficial since plating operations require specialized manufacturing facilities and the terminal 102 must be transported to the plating operation. In contrast, laser or resistance welding of the contact insert 114 is more suitable to be utilized at the point of manufacture of the electrical connector 100, thereby reducing processing and manufacturing costs.

A portion of the mating terminal that interfaces with the contact insert 114 may be plated with gold or silver to further reduce the contact resistance between the terminal 102 and the mating terminal. Alternatively, a copper contact plate (not shown) similar to the contact insert 114 having an array of negative protrusions without an array of positive protrusions may be plated with silver or gold and laser or resistance welded to the portion of the mating terminal that interfaces with the contact insert 114 to further eliminate the need to add silver or gold plating to the mating terminal.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector, comprising:
- a generally planar terminal;
- a U-shaped retainer having a first side wall attached to the terminal, a second side wall separated from and substantially parallel to the first side wall, and an end wall interconnecting the first side wall and the second side wall, wherein the terminal is located intermediate the first side wall and the second side wall;
- a resilient spring disposed intermediate the second side wall and the terminal and attached to the second side wall; and
- a contact insert separate and distinct from the resilient spring, the contact insert defining an array of paired negative and positive protrusions, the negative protrusions being welded directly to the terminal, the spring being configured to exert a normal connection force on the array of paired negative and positive protrusions and form electrical contact points between the terminal and a planar mating terminal inserted into a gap between the spring and the contact insert through the array of paired negative and positive protrusions.

2. The electrical connector in accordance with claim 1, wherein the terminal and the contact insert are formed of copper-based materials and the retainer and the spring are formed of steel materials.

3. The electrical connector in accordance with claim 1, wherein the contact insert defines a plurality of strips that form the array of paired negative and positive protrusions and wherein the contact insert defines a plurality of slots between the plurality of strips.

4. The electrical connector in accordance with claim 3, wherein the plurality of strips have an undulating shape that forms the array of paired negative and positive protrusions.

5. The electrical connector in accordance with claim 3, wherein embossments on edges of the plurality of strips form the array of paired negative and positive protrusions.

6. The electrical connector in accordance with claim 5, wherein the embossments form each protrusion in the array of paired negative and positive protrusions in the shape of a spherical quadrant.

7. The electrical connector in accordance with claim 1, wherein the spring provides a majority of the normal connection force between the positive protrusions and the mating terminal.

8. An electrical connector assembly, comprising:
- a generally planar first terminal;
- a U-shaped retainer having a first side wall attached to terminal, a second side wall separated from and substantially parallel to the first side wall, and an end wall interconnecting the first side wall and the second side wall, wherein the terminal is arranged intermediate the first side wall and the second side wall;
- a resilient spring disposed intermediate the second side wall and the terminal and attached to the second side wall;
- a contact insert separate and distinct from the resilient spring that is disposed intermediate the spring and the terminal, the contact insert defining an array of paired negative and positive protrusions, the negative protrusions being welded directly to the terminal; and
- a planar mating terminal inserted into a gap between the spring and the contact insert, the spring being configured to exert a normal connection force mating terminal and establish electrical contact points between the terminal and the mating terminal through the array of paired negative and positive protrusions of the contact insert.

9. The electrical connector assembly in accordance with claim 8, wherein the terminal, the mating terminal, and the contact insert are formed of copper-based materials and the retainer and the spring are formed of steel materials.

10. The electrical connector assembly in accordance with claim 8, wherein the contact insert defines a plurality of strips that form the array of paired negative and positive protrusions and wherein the contact insert defines a plurality of slots between the plurality of strips.

11. The electrical connector assembly in accordance with claim 10, wherein the plurality of strips have an undulating shape that forms the array of paired negative and positive protrusions.

12. The electrical connector assembly in accordance with claim 10, wherein embossments on edges of the plurality of strips form the array of paired negative and positive protrusions.

13. The electrical connector assembly in accordance with claim 8, wherein the spring provides a majority of the normal connection force between the positive protrusions and the mating terminal.

14. The electrical connector assembly in accordance with claim 8, further comprising a planar contact plate welded to the mating terminal and arranged intermediate the positive protrusions and the mating terminal.

15. A method of manufacturing an electrical connector assembly, comprising:

providing a generally planar terminal;

attaching a U-shaped retainer to the terminal;

arranging a resilient spring intermediate the terminal and the retainer;

forming a contact insert from a flat sheet of material to define an array of paired negative and positive protrusions, the contact insert being separate and distinct from the resilient spring;

welding the negative protrusions of the contact insert to the terminal;

arranging the contact insert between the spring and the terminal;

inserting a planar mating terminal into a gap between the spring and the contact insert;

exerting a normal connection force provided by the spring on the array of paired negative and positive protrusions; and establishing electrical contact points between the terminal and the mating terminal through the array of paired negative and positive protrusions.

16. The method in accordance with claim 15, further comprising creating a plurality of slots in the contact insert thereby forming a plurality of strips that provide the array of paired negative and positive protrusions.

17. The method in accordance with claim 16, further comprising forming the strips to have an undulating shape that provides the array of paired negative and positive protrusions.

18. The method in accordance with claim 16, further comprising embossing edges of the plurality of strips such that the array of paired negative and positive protrusions are formed in the shape of a spherical quadrant.

* * * * *